United States Patent [19]

Babb et al.

[11] Patent Number: 4,603,867
[45] Date of Patent: Aug. 5, 1986

[54] SPINNER CHUCK

[75] Inventors: Richard R. Babb, Apache Jct.; Howard A. Kirschler, Tempe, both of Ariz.

[73] Assignee: Motorola, Inc., Schaumburg, Ill.

[21] Appl. No.: 596,207

[22] Filed: Apr. 2, 1984

[51] Int. Cl.[4] .............................................. B23B 31/30
[52] U.S. Cl. ......................................... 279/3; 51/235; 264/DIG. 78; 269/21
[58] Field of Search ............... 279/3; 269/21, 22, 296; 51/235; 409/903; 264/571, DIG. 78; 83/451

[56] References Cited

U.S. PATENT DOCUMENTS

| | | | |
|---|---|---|---|
| 2,443,987 | 6/1948 | Morrison et al. | 269/21 |
| 2,730,370 | 1/1956 | Brewster | 269/21 X |
| 2,955,829 | 10/1960 | Brewster | 279/3 |
| 3,484,093 | 12/1969 | Mermelstein | 269/21 |
| 3,730,134 | 5/1973 | Kadi | 279/3 X |
| 4,183,545 | 1/1980 | Daly | 279/3 |
| 4,357,006 | 11/1982 | Hayes | 279/3 X |
| 4,420,585 | 9/1984 | Bavelloni | 269/21 |
| 4,428,815 | 1/1984 | Powell et al. | 269/21 X |

FOREIGN PATENT DOCUMENTS 18967 2/1978 Japan .................................... 269/21

Primary Examiner—Gil Weidenfeld
Assistant Examiner—Glenn L. Webb
Attorney, Agent, or Firm—Robert M. Handy

[57] ABSTRACT

A vacuum spinner chuck having improved holding power for thin wafers is obtained by providing a retention means for moveably holding an O-ring on the peripheral edge of the chuck. There is a first part-circular portion adjacent the upper surface of the chuck, arranged so that in the absence of vacuum the O-ring protrudes above the chuck surface and contacts the wafer. Below this first part-circular portion is a second sloped portion which tilts away from the surface of the spinner chuck by an angle preferably in the range 30–60 degrees. There is a smooth transition between these two portions. When vacuum is applied to the space between the wafer and the chuck, the wafer presses on the O-ring causing it to stretch and move down from the part-circular portion onto the sloped portion until the wafer rests on the surface of the chuck. The stretch creates an opposing force which holds the O-ring in contact with the wafer and the spinner chuck to prevent loss of vacuum. The stretch automatically returns the O-ring to its initial position when the vacuum is removed. The holding power of the chuck is doubled.

16 Claims, 9 Drawing Figures

SPINNER CHUCK

BACKGROUND OF THE INVENTION

1. Field of the Invention

This invention relates in general to means and methods for holding electronic substrates, and, more particularly, to improved means and methods for holding and/or spinning semiconductor wafers on vacuum chucks, especially those used in wafer processing and testing.

2. Background Art

Vacuum chucks are much used in the manufacture of electronic devices, particularly for electronic devices which are processed in the form of this wafers or substrates. Familiar examples are semiconductor devices, integrated circuits, hybrid circuits, bubble memory circuits, and Josephson device circuits. The substrates used for the construction of these types of devices or circuits are generally in the form of substantially flat thin wafers made of semiconducting or insulating materials. As used herein, the word wafer is intended to refer generally to thin substrates used for forming various types of electronic devices.

As a part of the manufacturing process for these types of electronic devices and circuits, it is common to apply a variety of different layers to the wafer surface. Photoresist masking techniques are often used to pattern these different layers. The photoresists, as well as other materials, are applied by first placing a small droplet of the material on the wafer surface and then spinning the wafer at a high speed so that centrifugal force spreads the droplet out into a thin uniform layer. The wafer is generally held in place on the spinner head or chuck by means of a vacuum applied to holes or grooves in the face of the chuck against which the wafer rests. Spinning apparatus of this sort is well-known and commerically available.

In a typical spinner apparatus, the wafers are rotated at a high rate of speed, typically in the range 1000-10000 RPM. These high rotational speeds create large sheer forces during the spinning operation which tend to throw the wafer off the chuck. The more imperfect the centering of the wafer on the chuck and the more irregular the shape of the wafer, the greater the forces which the wafer will experience during the spinning operation. A common failing of prior art spinner apparatus has been the inability of the spinner chuck to reliably hold the wafers in place during the spinning operation. Some fraction of the wafers placed on the spinner chuck fly off and break during processing. Accordingly, there is a continuing need for improved spinner apparatus which exhibits a reduced incidence of wafer breakage.

Prior art attempts to improve wafer retention on spinner chucks have involved the use of O-rings at the periphery of the chuck to improve the vacuum seal between the wafer and the surface of the chuck. The greater the vacuum which can be maintained during the spinning operation, the greater the holding power of the spinner chuck, and the lower the probability of wafer fly-off and breakage.

However, conventional O-ring seals between the wafer and the spinner chuck have not proved satisfactory. The presence of the O-ring introduces other forms of yield loss which negate the advantage of the increased holding force. The presence of the O-ring prevents the wafer from being uniformly supported on the surface of the chuck. As a consequence, when vacuum is applied, the very thin wafers bend rather than compressing the O-rings. Some wafers will break when bent. Even if they do not break, the bent shape degrades the uniformity of the layer being spun. Further, prior art chucks, with or without O-rings, function poorly when the wafer is not perfectly flat.

Accordingly, it is an object of the present invention to provide an improved means and method for obtaining reduced wafer breakage in spinner apparatus.

It is a further object of the present invention to provide an improved wafer chuck having greater wafer retention force.

It is an additional object of the present invention to provide an improved means and method for obtaining a vacuum seal between wafers and a platform for supporting wafers without introducing significant wafer breakage and uneven distribution of spun coatings.

It is a further object of the present invention to provide an improved means and method for an O-ring sealed vacuum chuck in which the wafer is supported by the chuck surface and not the O-ring.

It is an additional object of the present invention to provide a moveable seal between the wafer and chuck which can better accommodate non-flat wafers.

SUMMARY OF THE INVENTION

These and other objects and advantages are achieved through the present invention wherein there is provided a platform for supporting a wafer comprising: a first surface adapted to receive the wafer; an O-ring retention means at the periphery of the first surface, adapted to retain an O-ring for sealing against the wafer; wherein the O-ring retention means comprises a first recessed or depressed portion located below the first surface and adapted to moveably retain the O-ring in a first position so that a portion of the O-ring for contacting the wafer protrudes above the first surface; wherein the O-ring retention means has an extension portion located beneath the recessed portion and communicating therewith, and sloping away from the first surface; and wherein the extension portion is adapted to maintain contact with the O-ring to prevent loss of vacuum for retaining the wafer on the platform, while allowing portions of the O-ring to move perpendicular to the first surface onto the extension portion when pressure is exerted on the O-ring by the wafer, and to return these portions of the O-ring to their first position when the pressure is removed from the O-ring.

In a preferred embodiment, the recessed portion has a cross-section formed from a part of a circle. Extending from the bottom portion of the part circular cross-section is a conical section whose surface slopes away from the wafer supporting surface of the vacuum chuck by an angle less than 90°, conveniently in the range 20°-70°, and preferably in the range 30°-60°. When vacuum suction presses the wafer against the upper surface of the O-ring, the O-ring moves perpendicular to the upper surface of the chuck, rolling or sliding down from the part circular recessed portion onto the conically shaped extension portion. In this process, the O-ring is slightly stretched. This provides a reaction force which maintains the O-ring in contact with the wafer and the spinner chuck so that the vacuum seal is preserved. When the suction is removed on completion of the spinning operation, the reaction force automatically returns the O-ring to its initial position protruding from the surface of the spinner chuck.

DETAILED DESCRIPTION OF THE DRAWINGS

Figure 1A:
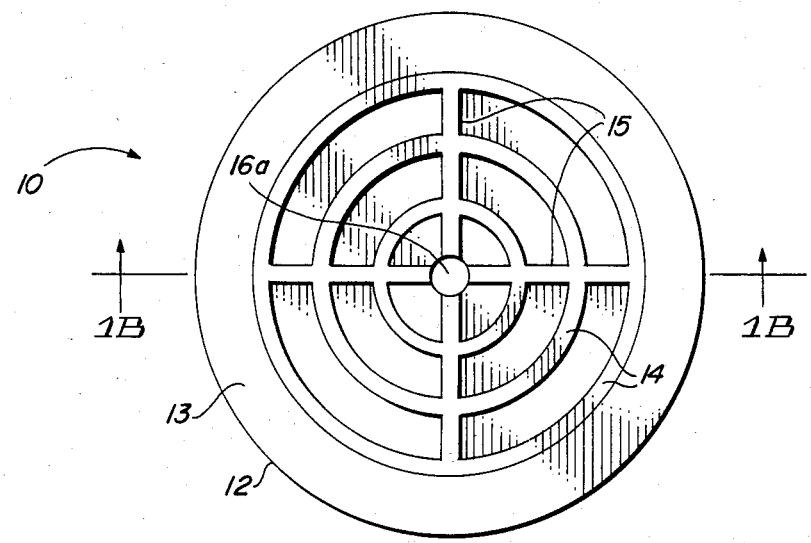
FIGS. 1A–B show, respectively, a top view and a cross-sectional view of a spinner chuck according to the prior art.
Figure 1B:
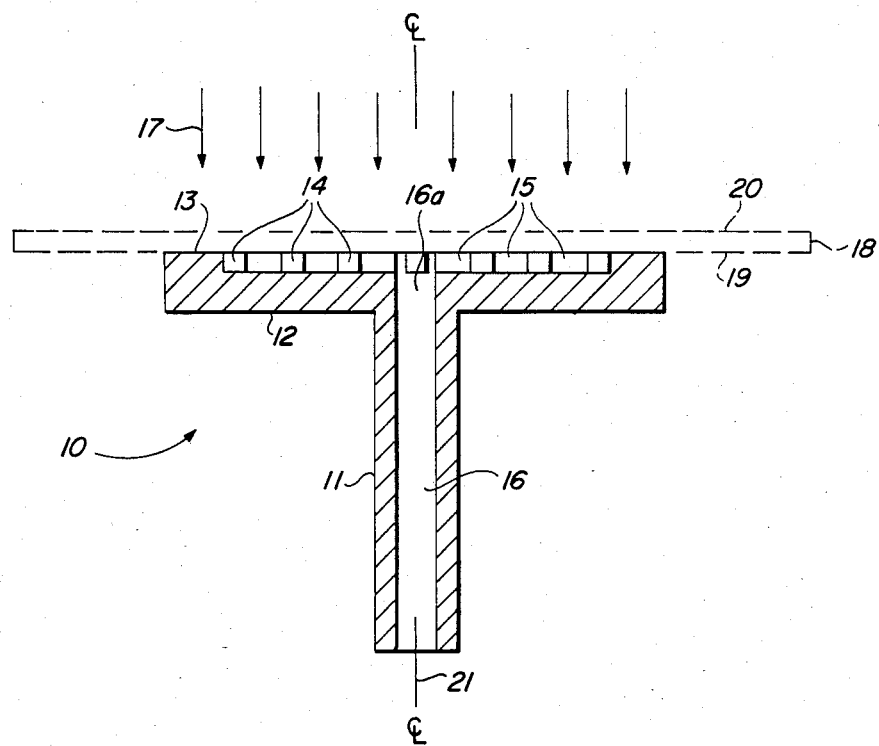
Figure 1C:
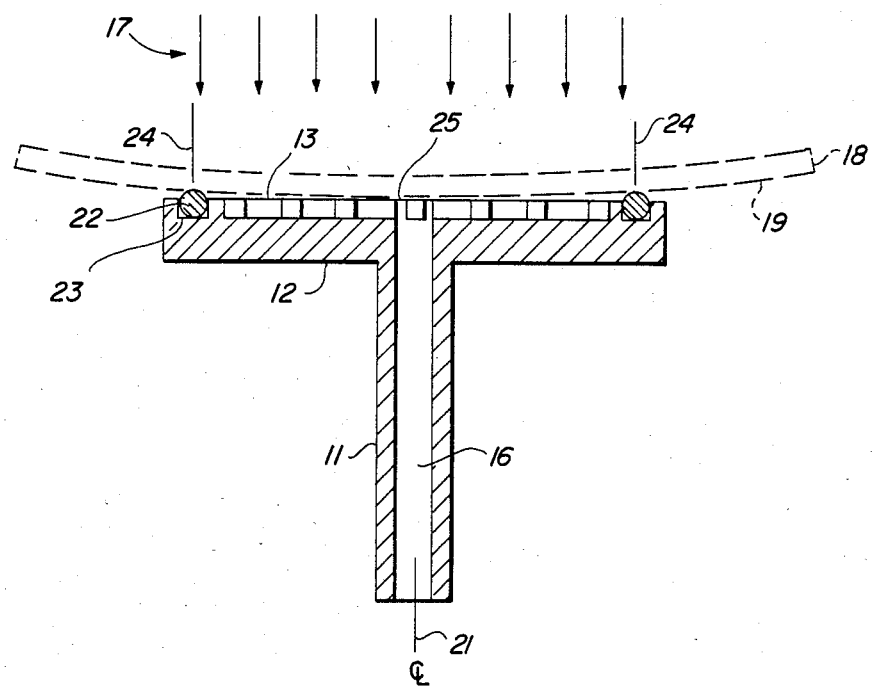
FIG. 1C shows a cross-sectional view of a spinner chuck, similar to that of FIG. 2B, but employing an O-ring to seal against the wafer.

FIGS. 1A–C show, in simplified form, a top view and cross-sectional views, respectively, of spinner chuck 10 according to the prior art. Spinner chuck 10 has spindle 11 containing through-hole 16. At one end of spindle 11 is located wafer support platform 12 with upper surface 13 adapted to receive wafer 18, shown by dotted lines in FIGS. 1B–C. Upper surface 13 of wafer support platform 12 has therein circular grooves 14 and radial grooves 15 communicating to opening 16a of through-hole 16. Vacuum suction is applied to lower surface 19 of wafer 18 in contact with upper surface 13 of platform 12 by means of through-hole 16 and grooves 14 and 15. The pressure in the space between wafer surface 19 and spinner chuck surface 13 is reduced below atmospheric pressure, so that there is a net force produced by atmospheric pressure and indicated by arrows 17, pressing on upper surface 20 of wafer 18. This atmospheric pressure on wafer 18 provides a lateral frictional force holding wafer 18 on surface 13 of spinner chuck 10.

Spinner chuck 10 is adapted to be rotated at high speed around axis 21. The rotation of spinner chuck 10 and attached wafer 18 produces strong centrifugal forces which in general will not be perfectly balanced. If wafer 18 is flat and reasonably well centered around axis 21, then the atmospheric pressure indicated by arrows 17 will produce sufficient lateral friction to keep wafer 18 in place in spite of the unbalanced centrifugal force, and wafer 18 will remain on spinner chuck 10. However, if wafer 18 is not flat then the seal between face 19 of wafer 18 and surface 13 of chuck platform 12 will be imperfect and the frictional holding force will be reduced. Under these circumstances, wafer 18 is much more likely to fly off chuck 10 and be broken. This is a common occurrence with present day spinner chucks and results in reduced manufacturing yield and higher cost.

Prior art attempts to provide an improved seal between wafer 18 and surface 13 have involved the use of O-ring 22 located in conventional O-ring groove 23, as illustrated in FIG. 1C. O-ring groove 23 is shallower than the thickness of O-ring 22 so that a portion of O-ring 22 protrudes above surface 13 of spinner platform 12. Lower surface 19 of wafer 18 contacts O-ring 22 at perimeter 24 before contacting surface 13. When suction is applied to bore 16 and grooves 14-15, the atmospheric pressure shown by arrows 17 acts to compress O-ring 22. Generally, wafer 18 is quite thin compared to its diameter, so that it is not self supporting in the presence of the atmospheric pressure indicated by arrows 17. As a consequence, instead of compressing O-ring 22, wafer 18 deflects until central portion 25 of surface 19 is in contact with surface 13 of platform 12. Since many of the wafer substrates used for the construction of electronic devices are exceptionally brittle, wafer 18 will sometimes break when bent as indicated in FIG. 1C. Additionally, even if the bending of the wafer does not cause breakage, the curvature produces uneven thickness of the spun material, which tends to puddle in the center of the bowl-shaped bent wafer.

The use of O-ring 22 does little to improve the seal between surfaces 19 and 13 when wafer 18 is not flat, since the only way that wafer curvature or surface irregularity can be accommodated is through differences in the compression of O-ring 22 at different points on perimeter 24. Only very small irregularities in wafer flatness can be accommodated in this way, since most suitable O-ring materials do not deflect significantly under the pressures which can be applied without breaking or adversely bending wafer 18. As a consequence, there is little or no gain in performance and few if any of the commercially available spinner chucks utilize an O-ring for sealing against the wafer.

Figure 2A:
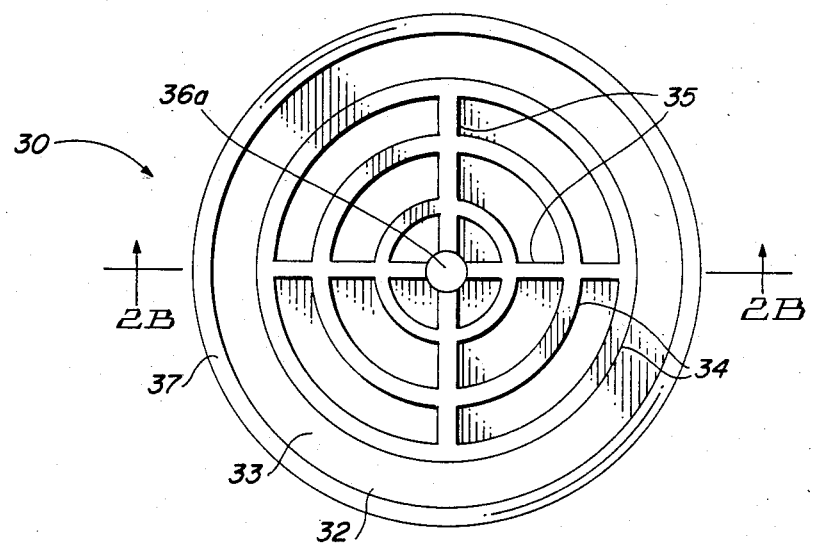
FIGS. 2A–B show, respectively, a top view and a cross-sectional view of a spinner chuck according to the present invention.
Figure 2B:
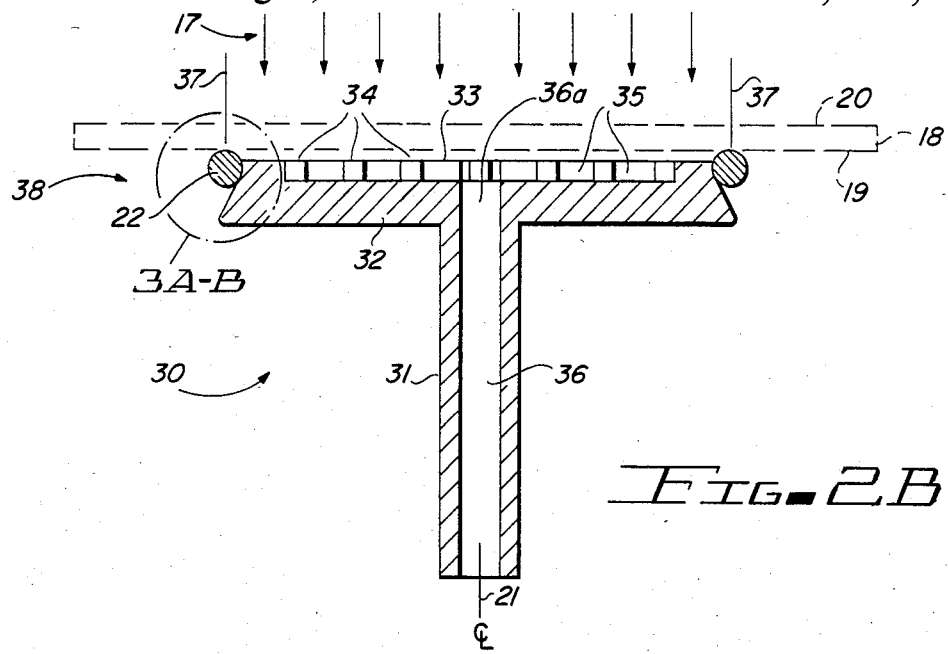

These and other problems may be avoided and improved performance obtained by use of the spinner chuck structure and O-ring seal arrangement of the present invention. FIGS. 2A–B show, respectively, a top view and cross-sectional view of spinner chuck 30 according to the present invention. Spinner chuck 30 has hollow spindle 31 containing through-hole 36. Attached to spindle 31 is wafer support platform 32 having upper surface 33 adapted to receive lower surface 19 of wafer 18. Upper surface 33 of wafer support platform 32 has therein circular grooves 34 and radial grooves 35, similar to grooves 14 and 15 of prior art chuck 10. Grooves 34 and 35 communicate to through-hole 36 of spindle 31 at 36a so that vacuum suction may be applied to the space between lower surface 19 of wafer 18 and upper surface 33 of wafer support platform 32.

Figure 3A:
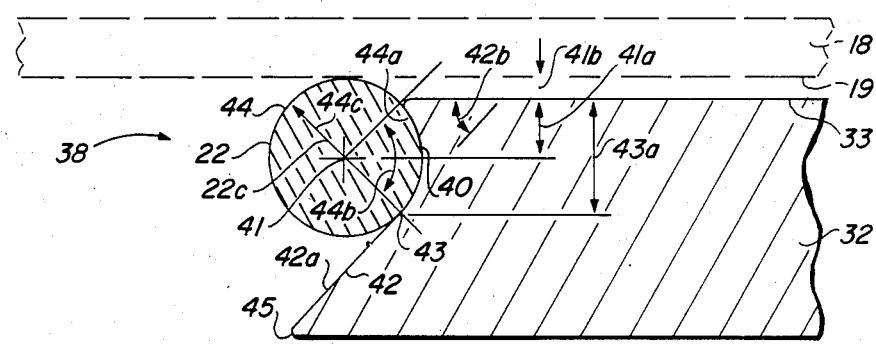
FIG. 3A shows an enlarged portion of the cross-section of FIG. 2B, according to the present invention, prior to the application of suction.
Figure 3B:
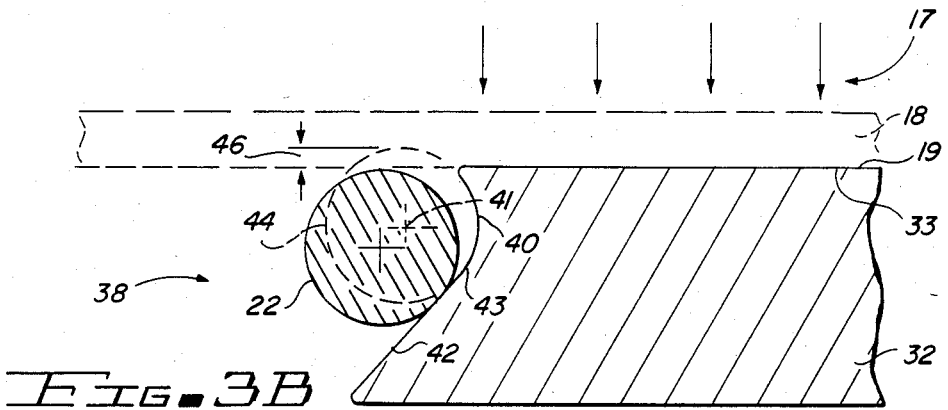
FIG. 3B shows the same portion as in FIG. 3A, after the application of suction.

Perimeter 37 of wafer support platform 32 has O-ring retention means 38 for moveably holding O-ring 22 so that a portion of O-ring 22 protrudes above upper surface 33 of platform 32 and contacts lower surface 19 of wafer 18. The design of O-ring retention means 38 can be more clearly seen by reference to FIGS. 3A–B, which illustrate the details of perimeter 37 of wafer support platform 32 and O-ring retention means 38, greatly enlarged. FIGS. 3A–B show, respectively, the relative position of O-ring 22 and O-ring retention means 38 with wafer 18 in place resting on O-ring 22, without vacuum suction applied to spinner chuck 30 (FIG. 3A), and with vacuum suction applied to spinner chuck 30 (FIG. 3B).

In a preferred embodiment, O-ring retention means 38 comprises two portions which are recessed or depressed below surface 33 of wafer support platform 32. First portion 40 has a perimeter of part circular shape, comprising sector 44a of included angle 44b of circle 44. Circle 44 has radius of curvature 44c and has center of curvature 41 located distance 41a below surface 33. Sector 44a extends from surface 33 of wafer platform 32 to tangent point 43 located below center to curvature 41. Distance 41a is less than radius of curvature 44c by O-ring protrusion amount 41b. First portion 40 is adapted to receive and moveably retain O-ring 22, and in three dimensions desirably has a shape matching the inside perimeter of an O-ring of circular cross-section. It is desirable that O-ring 22 have a cross-sectional radius 22c equal to radius of curvature 44c, so that O-ring 22 can make uniform contact with circular sector 44a. This avoids trapped gas pockets between O-ring 22 and mating portions 40 and 42 of spinner chuck 30. It is convenient that included angle 44b of sector 44a be in the range 60-140 degrees with 80-120 degrees being preferred.

Second portion 42 of retention means 38 has a perimeter which, in the cross-sectional view of FIGS. 3A-B, comprises substantially straight line 42a. Second portion 42 is located below first portion 40 and acts as a smoothly jointed extension to first portion 40. Second portion 42 begins at point 43 where sector 44a and straight line 42a tangentially intersect. Second portion 42 extends to point 45 where line 42a terminates. In three dimensions, portion 42 is a section of a cone. Line 42a and circular sector 44a intersect tangentially so that, in three dimensions, conical portion 42 and circular portion 40 mate without discontinuity. Line 42a and conical second portion 42 slope away from surface 33 of wafer platform 32 by angle 42b. Angle 42b is conveniently in the range 20°-70°, with the range 30°-60° being preferred. FIGS. 3A-B illustrate the situation where angle 42b is about forty-five degrees and angle 44b is about ninety degrees.

FIG. 3A shows the relative locations of wafer 18, O-ring 22, and wafer support platform 32 prior to application of vacuum suction to spinner chuck 30. FIG. 3B shows the arrangement after suction has been applied. In FIG. 3B, atmospheric pressure indicated by arrows 17 pushes wafer 18 against surface 33 of support plate 32. Wafer 18 need not compress O-ring 22 in order to seat against support surface 33, since by virtue of the design of O-ring retention means 38, O-ring 22 is able to move perpendicular to surface 33 by amount 46, equal to initial protrusion amount 41b above surface 33, without loss of vacuum suction. O-ring 22, or a part thereof, moves downward and outward from its initial position in contact with first portion 40 of retention means 38 onto extension portion 42 located below first portion 40. Since portions 40 and 42 intersect tangentially there is no loss of contact and hence no loss of vacuum accompanying this movement of O-ring 22.

As O-ring 22, or a part thereof, moves downward and outward along portion 42, it is slightly stretched. This creates a force opposing the motion. When the vacuum suction is removed, this opposing force acts to return O-ring 22 to its initial position in contact with portion 40 of retention means 38. This recovery action is entirely automatic, and is a very useful feature of the present design.

The opposing force cause by stretching O-ring 22, also keeps O-ring 22 in intimate contact with lower surface 19 of wafer 18. This is especially helpful where wafer 18 is not flat. For example, a "potato chip" wafer curl is frequently encountered after a wafer has been subjected to a few heating cycles. When wafer 18 is curled in this fashion, O-ring 22 is depressed fully flush with surface 33 where the curvature of wafer 18 is such that it makes contact with surface 33 at perimeter 37 of spinner chuck 30, but O-ring 22 remains elevated above surface 33 and in contact with wafer 18 in those portions of perimeter 37 where the curl prevents wafer 18 from contacting surface 33. Thus, excellent vacuum can be maintained between wafer 18 and spinner chuck 30 despite a non-flat wafer. This leads to increased retention force and a reduced probability that the wafer will be thrown off at high rotational speeds. By increasing distance 41b, larger amounts of wafer curl can be accommodated. It has been found that O-rings of silicone rubber manufactured by Parker Hannifin Co., Lexington, Ky. are suitable, but other types and makes of O-rings are also believed to be useful.

It has been observed that the holding power of the chuck, that is, the force required to slide a typical wafer laterally off the spinner chuck, is 8 lbs (3.6 Kgms) using the invented structure depicted in FIGS. 2A-B and 3A-B, as compared to 4 lbs (1.8 Kgms) using the prior art structure of FIGS. 1A-B. This is a direct measure of the retention force keeping the wafer on the spinner chuck. It is apparent that a 100% improvement over the prior art can be obtained using the invented arrangement. A substantial reduction in wafer breakage is also observed. Also, since the wafer is not bent down in the central portion, as with prior art O-ring arrangements, there is no puddling of the spun material and more uniform layers are obtained.

The vertical force necessary to make O-ring 22 move downward so that wafer 18 can seat against surface 33 depends on the sliding or rolling friction between O-ring 22 and surfaces 40 and 42. This can be controlled by varying the size of the O-ring, which controls the amount of initial stretch needed to place the O-ring around the rim of the wafer platform, and by varying the angle of surface 42 with respect to surface 33, which controls the amount of additional stretch required per unit vertical movement of O-ring 22. These parameters can be adjusted so that O-ring 22 moves down at forces well below that which produces significant wafer breakage. This is important since the vertical force for moving O-ring 22 originates from the atmospheric pressure on the wafer, and must be transmitted through wafer 18 to O-ring 22. For silicone rubber O-rings having a Shore A Durometer hardness of 40-60, preferably about 50, it has been found that an initial diameter stretch of 2-5% is convenient when slope angle 42b of portion 42 is about 45°. As slope angle 42b is increased, a larger initial diameter stretch may be used, for example, in the range 3-7% for angle 42b of about 60°.

Figure 4A:
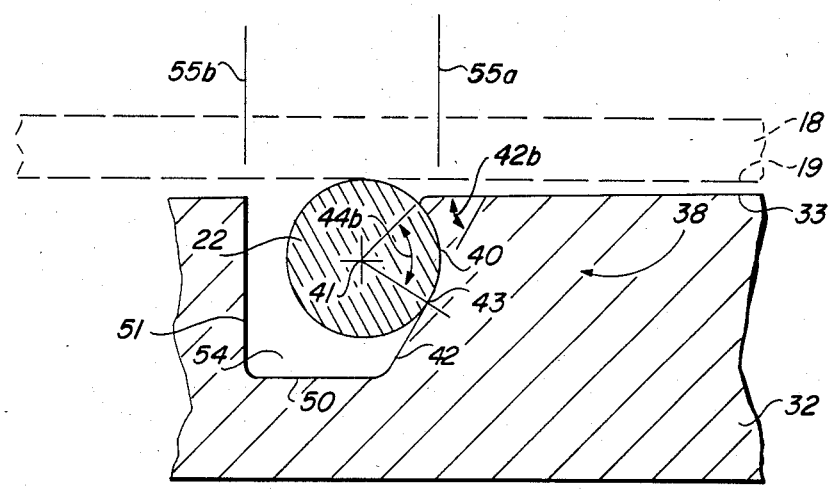
FIGS. 4A–B show enlarged portions of the cross-section of a spinner chuck, similar to that of FIGS. 3A–B and according to further embodiments of the present invention.
Figure 4B:
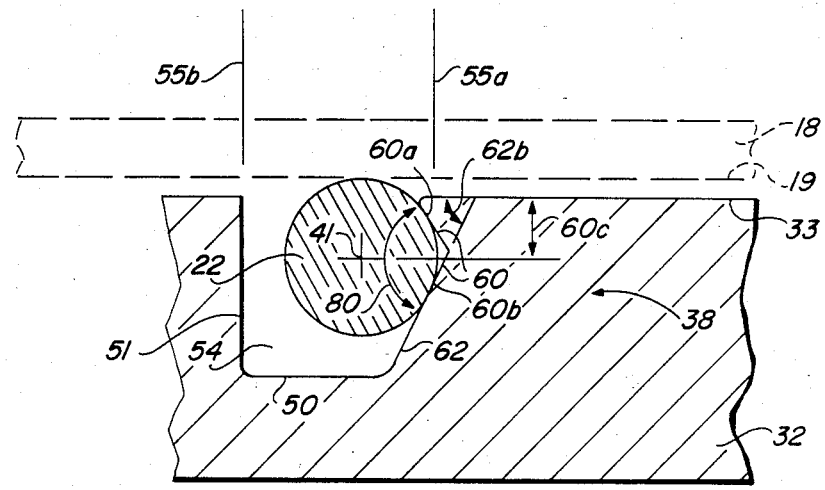

While it is convenient to mount O-ring 22 at periphery 37 of platform 32, this is not essential. FIGS. 4A-B depict alternative embodiments of the present invention in which O-ring 22 is placed in groove 54 in platform 32, rather than at periphery 37. It is desirable that O-ring retention means 38 be located on interior perimeter 55a rather than exterior perimeter 55b of groove 54. It is important that bottom 50 and exterior perimeter sidewall 51 of groove 54 be such as to not interfere with the outward and downward movement of O-ring 22 from first portions 40 or 60 onto second extension portions 42 and 62. This movement has been previously described in connection with FIGS. 3A-B. FIG. 4A depicts the same configuration of portions 40 and 42 as shown in FIGS. 3A-B, but with angle 42b about sixty degrees and angle 44b about seventy-five degrees. FIG. 4B illustrates an alternative embodiment wherein circular sector 44a has been replaced by, in cross-section, intersecting lines 60a-b, where line 60b smoothly joins line 62. Line 62 is analogous to line 42 of FIGS. 3A-B. The intersection of lines 60a-b is located at distance 60c below surface 33, analogous to the location of center of curvature 41 of circle 44 in FIGS. 3A-B. It is desirable that lines 60a–b have an included angle in the range 60°–140°. FIG. 4B illustrates the situation in which angle 62b between line (or surface) 62 and surface 33 is about sixty degrees, and angle 80 between lines (or surfaces) 60a and 60b is about one hundred and twenty degrees. While the arrangement of FIG. 4B is useful, it is less desirable than that of FIGS. 3A–B or 4A, because of the trapped gas pocket which can form at the intersection of lines 60a–b, behind O-ring 22.

In use, wafer 18 is placed on chuck 30 so that it rests on protruding O-ring seal 22. A pressing force, e.g. atmospheric pressure, is applied to surface 20 of wafer 18. O-ring 22 moves downward and is radially stretched until wafer 18 seats against surface 33. Chuck 30 with attached wafer 18 is then spun around axis 21 while the material to be coated is placed on the center of the wafer. The centrifugal force spreads out the material into a uniform coating. The spinning is stopped, the pressing force is released, and the wafer is removed. The opposing force created by the stretching of O-ring seal 22 returns O-ring seal 22 to its original position prior to the application of the pressing force.

It will be apparent that the invented arrangement provides for improved retention of thin wafers on vacuum chucks, particularly spinner chucks, and is better able to resist the unbalanced centrifugal forces encountered in operation of spinner chucks at high rotational speeds. It is further apparent that the invented arrangement provides a better seal to the wafer on the chuck than has been possible with prior art methods, and is better able to accommodate non-flat wafers without loss of lateral holding power. Additionally, this improved lateral holding power can be obtained without wafer bending such as to produce puddling of the spun coatings. Any wafer bending which takes place as a result of the atmospheric force tends to flatten the wafer against the chuck rather than bending it over a fixed O-ring, as in the prior art. Manufacturing yield in processes using vacuum spinner chucks is improved, wafer breakage and costs are reduced, and more uniform spun layers are obtained.

We claim:

1. A vacuum chuck for spinning a wafer during processing, comprising:
    a wafer platform for supporting said wafer on a first surface;
    spindle means centrally attached to said wafer platform adapted to connect said wafer platform to a means for spinning said platform;
    channels in said first surface of said wafer platform adapted to provide a source of suction;
    a depressed region in said first surface of said wafer platform located laterally exterior to said channels and adapted to receive an O-ring of a pre-determined thickness for sealing against said wafer;
    wherein said depressed region is wider and deeper than said pre-determined thickness;
    wherein said depressed region has a first sidewall portion adapted to moveably retain said O-ring so that, in the absence of said wafer, the upper surface of said O-ring protrudes above said first surface; and
    wherein said depressed region has a substantially straight second sidewall portion to moveably receive said O-ring, and wherein said second sidewall portion is tangentially joined to said first sidewall portion, is sloped away from said spindle means at a substantially constant angle with respect to said first surface and is located below said first sidewall portion.

2. The chuck of claim 1 wherein said angle is in the range between 20 degrees and 70 degrees.

3. The chuck of claim 2 wherein said angle is in the range between about 30 and 60 degrees.

4. A vacuum chuck for spinning a wafer during processing, comprising:
    a wafer platform for supporting said wafer on a first surface;
    spindle means centrally attached to said wafer platform adapted to connect said wafer platform to a means for spinning said platform;
    channels in said first surface of said wafer platform adapted to provide a source of suction;
    a depressed region in said first susrface of said wafer platform located laterally exterior to said channels and adapted to receive an O-ring of a pre-determined thickness for sealing against said wafer;
    wherein said depressed region is wider and deeper than said pre-determined thickness;
    wherein said depressed region has a first sidewall portion adapted to moveably retain said O-ring so that, in the absence of said wafer, the upper surface of said O-ring protrudes above said first surface;
    wherein said depressed region has a second portion sloped away from said spindle means at a substantially constant angle with respect to said first surface and located below said first sidewall portion; and
    wherein said first sidewall portion has a toroidal-shape conforming to the interior radius of said O-ring and said second sloped portion has a conical-shape and wherein said first and second portions join tangentially.

5. A rotatable holder for wafer processing, comprising:
    a platform having a first surface adapted to receive said wafer;
    spindle means centrally coupled to said platform at a right angle thereto for rotating said first surface about the longitudinal axis of said spindle;
    retention means at the periphery of said first surface adapted to moveably retain an O-ring for sealing against said wafer and having a depth greater than the thickness of said O-ring;
    wherein said retention means comprises a recessed region located below said first surface and adapted to moveably retain said O-ring in a first position so that a first portion of said O-ring for contacting said wafer protrudes above said first surface;
    wherein said O-ring retention means comprises an extension portion, located beneath said recessed region and smoothly joined therewith, and sloping away from said first surface at an angle with respect to said first surface of not less than the angle of said recessed region measured with respect to said first surface in a plane perpendicular to said first surface where said recessed region intersects said extension region; and
    wherein said recessed region has a cross-section whose perimeter comprises a sector of a circle, wherein said sector of said circle has a center of curvature located beneath said first surface by a distance less than the radius of curvature of said circle, wherein said extension portion has a cross-section whose perimeter comprises a substantially straight line sloping away from said first surface at a predetermined substantially constant angle, and wherein said sector of said circle and said line intersect tangentially at a point located below said center of curvature.

6. The platform of claim 5 wherein said sector of said circle has an included angle in the range of about 60 to 140 degrees.

7. The platform of claim 6 wherein said sector of said circle has an included angle in the range of about 80 to 120 degrees.

8. A method for spinning a wafer comprising:
providing a wafer chuck having a peripheral seal holding groove with a conical skirt below said groove;
providing in said groove a moveable circular seal for contacting and sealing against said wafer and said wafer chuck, wherein a portion of said seal protrudes from a first surface of said chuck;
placing a wafer on said seal above said first surface;
applying a pressing force to said wafer in a direction toward said first surface;
moving said seal, in contact with said wafer and said wafer chuck, downwards over said conical skirt without substantially crushing said seal while simultaneously radially stretching said seal to provide an opposing force for sealing and for automatically restoring said seal to its position prior to said applying step after spinning is stopped; and
spinning said chuck and said wafer.

9. The method of claim 8 further comprising, after said applying step, moving said wafer in the direction of said pressing force to lie substantially flat against said first surface of said wafer chuck.

10. A method for mounting a fragile wafer on a chuck for processing, comprising:
providing a chuck having a seal holding means including a conical skirt located below a first surface of said chuck, for retaining a moveable seal for contacting and sealing against said wafer and said chuck, wherein a portion of said seal protrudes from said first surface of said chuck and wherein said seal holding means and skirt together have a depth perpendicular to said surface exceeding the thickness of said seal;
placing a wafer on said seal above said first surface;
applying a pressing force to said wafer in a direction toward said first surfaqce;
moving said seal away from said surface along said conical skirt, in contact with said wafer and said chuck, without substantially crushing said seal; and
applying a centrifugal force to said moveable seal.

11. The method of claim 10 wherein said step of applying said centrifugal force comprises rotating said moveable seal about an axis substantially perpendicular to the plane of said wafer.

12. A method for holding wafers, comprising:
providing a wafer chuck having a first surface containing a vacuum suction means, an elastic seal, and a retaining means for moveably retaining said elastic seal, wherein said retaining means has a depth greater than the thickness of said seal, a first portion for initially locating said seal adjacent said first surface, and a second portion adjacent said first portion for retracting said seal so as to be, except for irregularities in said wafer, substantially flush with said first surface;
locating said elastic seal in said first portion of said retaining means so that it initially protrudes from said first surface by a predetermined distance;
placing a wafer on the protruding surface of said elastic seal;
applying vacuum suction to draw said wafer toward said first surface; and
retracting said seal by moving said seal perpendicular to said first surface by a first amount not more than said pre-determined distance while at the same time radially stretching said seal by a second amount directly proportional to said first amount and spinning said chuck.

13. A rotatable holder for wafer processing, comprising:
a platform having a first surface adapted to receive said wafer;
spindle means centrally coupled to said platform at a right angle thereto for rotating said first surface about the longitudinal axis of said spindle;
retention means at the periphery of said first surface adapted to moveably retain an O-ring for sealing against said wafer and having a depth greater than the thickness of said O-ring;
wherein said retention means comprises a recessed region located below said first surface and adapted to moveably retain said O-ring in a first position so that a first portion of said O-ring for contacting said wafer protrudes above said first surface; and
wherein said O-ring retention means comprises an extension portion for moveably receiving said O-ring, located beneath said recessed region and smoothly joined therewith, and sloping away from said first surface at a subtantially constant angle with respect to said first surface of not less than the angle of said recessed region measured with respect to said first surface in a plane perpendicular to said first surface where said recessed region intersects said extension region.

14. The chuck of claim 13 wherein said angle is in the range 20 to 70 degrees.

15. The chuck of claim 13 wherein said angle is in the range 30 to 60 degrees.

16. A vacuum chuck for retaining a wafer, comprising:
a first surface of said chuck adapted to receive said wafer;
suction means in said first surface for applying suction to said wafer to cause it to move toward said first surface; and
retention means in said first surface for moveably retaining an O-ring for sealing against said wafer and said chuck while said O-ring slides or rolls away from said first surface in response to the motion of said wafer toward said first surface, said retention means having a first portion adjacent said first surface for initially locating said O-ring so that it partially protrudes from said first surface and a second portion below said first portion, joining smoothly therewith, and making an angle with respect to said first surface which does not decrease with increasing distance from said first surface.

* * * * *